United States Patent
Amringer et al.

(10) Patent No.: US 11,693,998 B2
(45) Date of Patent: Jul. 4, 2023

(54) METHOD FOR PROVIDING A REAL-TIME-CAPABLE SIMULATION FOR CONTROL UNIT DEVELOPMENT, AND SIMULATION DEVICE FOR CONTROL UNIT DEVELOPMENT

(71) Applicant: dSPACE digital signal processing and control engineering GmbH, Paderborn (DE)

(72) Inventors: Nicolas Amringer, Lippstadt (DE); Dominik Holler, Schlangen (DE); Steffen Beringer, Paderborn (DE)

(73) Assignee: dSPACE GmbH, Paderborn (DE)

( * ) Notice: Subject to any disclaimer, the term of this patent is extended or adjusted under 35 U.S.C. 154(b) by 1033 days.

(21) Appl. No.: 16/113,560

(22) Filed: Aug. 27, 2018

(65) Prior Publication Data
US 2019/0073437 A1    Mar. 7, 2019

(30) Foreign Application Priority Data
Sep. 6, 2017   (EP) .................................. 17189524

(51) Int. Cl.
*G06F 30/20*     (2020.01)
*G06F 30/15*     (2020.01)
(Continued)

(52) U.S. Cl.
CPC .............. *G06F 30/20* (2020.01); *G06F 30/15* (2020.01); *G06F 2111/10* (2020.01); *G06F 2117/08* (2020.01)

(58) Field of Classification Search
CPC ...... G06F 30/20; G06F 30/15; G06F 2111/10; G05B 17/02; G05B 2219/23445
(Continued)

(56) References Cited

U.S. PATENT DOCUMENTS 5,926,403 A * 7/1999 Ho .......................... G06F 30/23
                                                        703/2
6,425,762 B1 * 7/2002 Ernst ....................... G06F 9/465
                                                        434/30
(Continued)

FOREIGN PATENT DOCUMENTS

EP          2442248 A1 *  4/2012   ............ G06F 30/33
EP          2442248 A1     4/2012
WO     WO2004092928 A2   10/2004

OTHER PUBLICATIONS

Ren, W. et al., Interfacing Issues in Real-Time Digital Simulators, Apr. 2011, IEEE Transactions on Power Delivery, vol. 26 No. 2, pp. 1221-1230 (Year: 2011).*

(Continued)

*Primary Examiner* — Iftekhar A Khan
(74) *Attorney, Agent, or Firm* — Muncy, Geissler, Olds & Lowe , P.C.

(57) ABSTRACT

A method for providing a real-time-capable simulation for control unit development, wherein the real-time-capable simulation simulates a control unit or an environment of a control unit or a combination of a control unit and an environment of the control unit. The real-time-capable simulation has a co-simulation of a real-time-capable sub-simulation and a non-real-time-capable sub-simulation that interacts with the real-time-capable sub-simulation, wherein the real-time-capable sub-simulation and the non-real-time-capable sub-simulation are designed for communication of simulation data. The real-time-capable sub-simulation has a first simulation time corresponding to real time and the non-real-time-capable sub-simulation has a virtual, second simulation time that is coupled to the first simulation time and that matches the first simulation time at the start of the real-time-capable simulation.

19 Claims, 4 Drawing Sheets

(51) Int. Cl.
*G06F 111/10* (2020.01)
*G06F 117/08* (2020.01)

(58) Field of Classification Search
USPC .................................................. 703/6
See application file for complete search history.

(56) References Cited

U.S. PATENT DOCUMENTS

| | | | | |
|---|---|---|---|---|
| 6,577,908 | B1* | 6/2003 | Wojsznis | G05B 17/02 |
| | | | | 700/28 |
| 7,774,440 | B1* | 8/2010 | Bagrodia | H04L 41/0823 |
| | | | | 703/1 |
| 8,676,560 | B2* | 3/2014 | Kajitani | G06F 30/33 |
| | | | | 703/23 |
| 8,712,753 | B1* | 4/2014 | Gahinet | G06F 30/20 |
| | | | | 703/2 |
| 9,547,746 | B1* | 1/2017 | Gaudette | G06F 30/20 |
| 9,904,268 | B2* | 2/2018 | Blevins | G05B 19/0428 |
| 2002/0059052 | A1* | 5/2002 | Bloch | G06F 30/33 |
| | | | | 703/13 |
| 2004/0024578 | A1* | 2/2004 | Szymanski | G06F 30/20 |
| | | | | 703/17 |
| 2005/0004787 | A1* | 1/2005 | Kubischta | G06F 1/14 |
| | | | | 703/19 |
| 2005/0027500 | A1* | 2/2005 | Cornhill | G06F 9/455 |
| | | | | 703/13 |
| 2005/0155014 | A1* | 7/2005 | Andrade | G06F 8/34 |
| | | | | 717/105 |
| 2006/0149582 | A1* | 7/2006 | Hawkins | G06Q 10/067 |
| | | | | 705/348 |
| 2009/0306952 | A1* | 12/2009 | Kajitani | G06F 30/33 |
| | | | | 703/13 |
| 2011/0015916 | A1* | 1/2011 | Kataoka | G06F 30/15 |
| | | | | 703/19 |
| 2011/0154094 | A1* | 6/2011 | Richardson | G06F 11/0736 |
| | | | | 717/125 |
| 2013/0151220 | A1* | 6/2013 | Matsumura | G06F 30/20 |
| | | | | 703/7 |
| 2013/0185034 | A1* | 7/2013 | Murase | G06F 30/33 |
| | | | | 703/2 |
| 2013/0326098 | A1* | 12/2013 | Franzen | G06F 13/4286 |
| | | | | 710/105 |
| 2015/0242548 | A1* | 8/2015 | Jones | G05B 19/056 |
| | | | | 703/21 |
| 2016/0055278 | A1* | 2/2016 | Zehetner | G06F 17/10 |
| | | | | 703/2 |
| 2016/0085567 | A1* | 3/2016 | Holler | G05B 17/02 |
| | | | | 718/1 |
| 2016/0147920 | A1* | 5/2016 | Goulkhah | G06F 30/20 |
| | | | | 703/21 |
| 2018/0052698 | A1* | 2/2018 | Holler | G06F 9/45533 |
| 2019/0018916 | A1* | 1/2019 | Benedikt | G06F 30/33 |
| 2019/0073437 | A1* | 3/2019 | Amringer | G05B 17/02 |
| 2019/0204816 | A1* | 7/2019 | Hattori | G05B 19/05 |
| 2019/0377844 | A1* | 12/2019 | Benedikt | G06F 30/33 |
| 2020/0257835 | A1* | 8/2020 | Mikelsons | G06F 1/12 |
| 2021/0224437 | A1* | 7/2021 | Witte | G06F 30/20 |

OTHER PUBLICATIONS

Tranninger, Markus, Timo Haid, Georg Stettinger, Martin Benedikt, and Martin Horn. "Fault-tolerant coupling of real-time systems: a case study." In 2016 3rd Conference on Control and Fault-Tolerant Systems (SysTol), pp. 756-762. IEEE, 2016 (Year: 2016).*

Yan, Wei, Yuan Xue, Xiaowei Li, Jiannian Weng, Timothy Busch, and Janos Sztipanovits. "Integrated simulation and emulation platform for cyber-physical system security experimentation." In Proceedings of the 1st international conference on High Confidence Networked Systems, pp. 81-88. 2012 (Year: 2012).*

Bao-Ran, An, Wang Xiao-Li, and Liu Guo-Ping. "Networked predictive control and its simple application into a class of bilinear systems." In The 27th Chinese Control and Decision Conference (2015 CCDC), pp. 3743-3748. IEEE, 2015 (Year: 2015).*

Bernat, Guillem, Alan Burns, and Albert Liamosi. "Weakly hard real-time systems." IEEE transactions on Computers 50, No. 4 (2001): 308-321 (Year: 2001).*

Soudbakhsh, Damoon, Linh Thi Xuan Phan, Anuradha M. Annaswamy, and Oleg Sokolsky. "Co-design of arbitrated network control systems with overrun strategies." IEEE Transactions on Control of Network Systems 5, No. 1 (2016): 128-141 (Year: 2016).*

Stettinger, Georg, Martin Horn, Martin Benedikt, and Josef Zehetner. "A model-based approach for prediction-based interconnection of dynamic systems." In 53rd IEEE Conference on Decision and Control, pp. 3286-3291. IEEE, 2014 (Year: 2014).*

Yedavalli, Rama K., Saleh Zein-Sabatto, and Alireza R. Behbahani. "Framework for Distributed Engine Control System for Sampled-data Systems with Uncertain Time-varying Sampling Intervals and Delays with State Estimations." In 51st AIAA/SAE/ASEE Joint Propulsion Conference, p. 3990. 2015 (Year: 2015).*

European Search Report dated Feb. 27, 2018 for corresponding European application 17189524.6.

Zehetner et al "Echtzeit-Co-Simulation für die Regelung eines Motorprüfstands" ATZ Feb. 2014 116. Jahrgang; pp. 41-45.

Stettinger et al "Extending Co-Simulation to the Real-Time Domain";SAE International; Aug. 4, 2013; Austria.

Wu et al "Dynamic Test and Evaluating System for Flight Control System", SECS International Colloquium on Computing, Communication, Control, and Management; pp. 189-192.

Sarjoughian et al "Interacting Real-Time Simulation Models and Reactive Computational-Physical Systems", Proceedings of the 2013 Winter Simulation Conference; pp. 1120-1131.

Ren et al "Interfacing Issues in Real-Time Digital Simulators", IEEE Transactions on Power Delivery, vol. 26, No. 2, Apr. 2011; pp. 1221-1230.

* cited by examiner

METHOD FOR PROVIDING A REAL-TIME-CAPABLE SIMULATION FOR CONTROL UNIT DEVELOPMENT, AND SIMULATION DEVICE FOR CONTROL UNIT DEVELOPMENT

This nonprovisional application claims priority under 35 U.S.C. § 119(a) to European Patent Application No. 17189524.6, which was filed in the European Patent Office on Sep. 6, 2017, and which is herein incorporated by reference.

BACKGROUND OF THE INVENTION

Field of the Invention

The present invention relates to the development of control units, such as are used in the automotive industry or in the aviation industry, for example, for controlling technical systems such as, e.g., engines or brakes. In particular, the present invention relates to simulation devices that are used in the development process for the control unit.

Description of the Background Art

The development of control units has become a highly complex process. New control units and new control functions should thus be tested as early in the development process as possible in order to verify general functionality and to set the direction for further development. Towards the end of the development process, it is important to test the control unit, which has already undergone extensive development, as comprehensively as possible in order to make necessary modifications based on the test results before the control unit comes into use or enters mass production, so that it functions as desired under all conditions in later operation.

So-called hardware-in-the-loop simulators (HIL simulators) are employed at a fairly late stage of the development process. Such HIL simulators contain a model of the technical system to be controlled, with the model being present in software. The HIL simulator may additionally contain other models of technical systems that are in the environment of the control unit and of the technical system to be controlled and that interact with the control unit and/or the technical system to be controlled. The HIL simulator also contains an input/output interface to which it is possible to connect the control unit, which has already undergone extensive development and is physically present as hardware, also called a hardware implementation of the control unit. The functionality of the control unit can now be tested in various simulation passes, wherein it is possible to observe how the model of the technical system to be controlled reacts to the signals of the control unit, and how the control unit reacts to events predefined by the model of the technical system to be controlled. If applicable, it is also possible to observe the behavior of other technical systems from the environment of the control unit and the technical system to be controlled. In this process, it is possible to simulate not only normal operation, but also faults in the technical system to be controlled as well as faults in the control unit and faults in the communication between the control unit and the technical system to be controlled, such as, e.g., cable bridge, as well as faults in the power supply, such as, e.g., short circuits. The HIL simulator is an example of a simulation device equipped for control unit development. In particular, the HIL simulator is an example of a real-time-capable simulation device equipped for control unit development.

The effort for preparation of an HIL simulation is generally very high, especially when a multiplicity of sub-models or sub-simulations interact in the HIL simulator. In preparation for the simulation, the communication between the sub-models/sub-simulations is configured. The sub-models/sub-simulations operate in a real-time-capable manner, both individually and with regard to their communication. High demands are placed on the sub-models/sub-simulations in order to provide a construct that is real-time-capable as a whole for real-time-capable simulations.

SUMMARY OF THE INVENTION

It is therefore an object of the present invention to provide a greater flexibility in the creation of real-time-capable simulations. In addition, it is an object to provide a simulation device that makes possible a greater range of real-time-capable simulations.

Exemplary embodiments of the invention comprise a method for providing a real-time-capable simulation for control unit development, wherein the real-time-capable simulation simulates a control unit or an environment of a control unit or a combination of a control unit and an environment of the control unit, wherein the real-time-capable simulation has a co-simulation of a real-time-capable sub-simulation and a non-real-time-capable sub-simulation that interacts with the real-time-capable sub-simulation, wherein the real-time-capable sub-simulation and the non-real-time-capable sub-simulation are designed for communication of simulation data, and wherein the real-time-capable sub-simulation has a first simulation time corresponding to real time and the non-real-time-capable sub-simulation has a virtual, second simulation time that is coupled to the first simulation time and that matches the first simulation time at the start of the real-time-capable simulation. The method can include the following steps: (a) check on the part of the real-time-capable sub-simulation whether the non-real-time-capable sub-simulation has provided calculated simulation data for a pending macro-simulation step; (b) if the non-real-time-capable sub-simulation has completed calculating simulation data for the pending macro-simulation step and has provided it to the real-time-capable sub-simulation, use of the calculated simulation data for the pending macro-simulation step in the real-time-capable sub-simulation; (c) if the non-real-time-capable sub-simulation has not completed any calculated simulation data for the pending macro-simulation step and provided it to the real-time-capable sub-simulation, creation of estimated simulation data for the pending macro-simulation step; (d) setting of the second simulation time to the first simulation time after completion of the calculation of simulation data that was not provided on time.

Exemplary embodiments of the invention enable the integration of a non-real-time-capable sub-simulation and a real-time-capable sub-simulation into an overall simulation that is real-time-capable as a whole. In this way, new opportunities arise in the creation of real-time-capable simulations because it is no longer a mandatory requirement for each sub-simulation to be real-time-capable in itself. As a result, it is possible to dispense with the effort of creating a real-time-capable form for simulation components that are present in non-real-time-capable form and to dispense with the need to provide the greater resources for execution of the real-time-capable form during the simulation. As a result, simulations that are real-time-capable on the whole can be provided with less effort and greater flexibility. Exemplary embodiments of the invention can also make it possible for non-real-time-capable sub-simulations to be calculated with solution algorithms, so-called solvers, that are provided for use in non-real-time-capable simulations. As a result, greater flexibility can also arise with respect to the use of solution algorithms. Moreover, greater flexibility can be achieved by the means that non-real-time-capable models available from earlier development phases in the form of the non-real-time-capable sub-simulation can be integrated into a simulation that is real-time-capable on the whole. Such an integration can result in especially low effort in assembling the simulation components.

Exemplary embodiments of the invention enable, in particular, reliable further processing of the simulation, even when the non-real-time-capable sub-simulation is delayed, with a high degree of simulation accuracy being made possible at the same time by the coupling of the simulation times of the real-time-capable sub-simulation and the non-real-time-capable sub-simulation as well as the setting of the simulation time of the non-real-time-capable sub-simulation in the case of delays. The creation of estimated simulation data enables the real-time-capable sub-simulation to carry out the pending macro-simulation step in terms of sequence in exactly the same way as if calculated simulation data had been provided. While an adverse effect on the accuracy of the simulation may arise in the real-time-capable sub-simulation due to the estimation of the simulation data, the simulation execution itself remains unaffected, and the real-time-capable sub-simulation does not need to adjust its execution. The setting of the second simulation time to the first simulation time after completion of the calculation of simulation data that was not provided on time permits clear documentation on the part of the non-real-time-capable sub-simulation as to whether and how much the non-real-time-capable sub-simulation is delayed. Through the setting of the second simulation time to the first simulation time, a clear signal or unambiguous indication is provided by means of which the real-time-capable sub-simulation can derive a resynchronization of the non-real-time-capable sub-simulation. Consequently, through the setting of the second simulation time, a clear signal is produced for the overall simulation that it is possible to return from the estimated simulation data, which by definition is imperfect, to the calculated simulation data so that the highest possible accuracy can be achieved.

The estimation of simulation data as well as the coupling of the simulation times and the setting of the second simulation time to the first simulation time as a clear signal enable an uninterrupted execution of the overall simulation with high accuracy through the most extensive possible use of the calculated simulation data provided by the non-real-time-capable sub-simulation.

The real-time-capable simulation simulates a control unit, or an environment of a control unit, or a combination of a control unit and an environment of a control unit. In the above-described example of an HIL simulator, the real-time-capable simulation can simulate the environment of a control unit and can be executed on the HIL simulator. In particular, the real-time-capable simulation here can be the technical system to be controlled, if applicable in combination with interacting components. If, for example, an engine control unit is connected to the HIL simulator, the real-time-capable simulation can simulate the engine, if applicable also simulate, e.g., a combination of engine and transmission in order to provide the most realistic test environment possible for the engine control unit, which has already undergone extensive development and is physically present. When the real-time-capable simulation simulates a control unit, it is possible, for example, that this simulated control unit is connected to an already existing control unit to modify the control system or directly to a technical system to be controlled. In this way, a newly developed control system can be tested as a simulation in the real world at a very early stage of development. So-called Rapid Control Prototyping (RCP) is an example of a method for this purpose. The real-time-capable simulation can also simulate the combination of a control unit and an environment of the control unit. Thus, for example, the complete interaction of a simulated control unit and of a simulated technical system to be controlled can be tested at an extremely early stage of development within the real-time-capable simulation. The method according to exemplary embodiments of the invention can thus be used at many points of control unit development.

The real-time-capable simulation has a co-simulation of a real-time-capable sub-simulation and a non-real-time-capable sub-simulation that interacts with the real-time-capable sub-simulation. By definition, the real-time-capable sub-simulation is capable of having evaluated all input signals and having provided corresponding output signals at predetermined points in time. The predetermined points in time are points in real time, which is to say a time that corresponds to the time elapsing in reality. A multiplicity of mechanisms and a sufficiently high computing capacity provide for this deterministic behavior of the real-time-capable sub-simulation. The predetermined points in time at which the real-time-capable sub-simulation behaves deterministically and exchanges data with other sub-simulations or with other devices connected to the simulation, e.g., with a control unit connected to an HIL simulator, are called macro-simulation steps. In contrast, a multiplicity of micro-simulation steps, in which the real-time-capable sub-simulation calculates the results, generally take place within one macrostep in the real-time-capable sub-simulation. As compared to the real-time-capable sub-simulation, no such determinism is guaranteed in the non-real-time-capable sub-simulation. Because of the internal structure of the non-real-time-capable sub-simulation and/or the computing capacity of the non-real-time-capable sub-simulation, it is not guaranteed that the non-real-time-capable sub-simulation provides calculated simulation data for every macro-simulation step, as would be desirable for an ideal simulation.

As already indicated above, the real-time-capable sub-simulation has a first simulation time corresponding to real time. The first simulation time consequently corresponds to the time elapsing in reality, at least at the predefined points in time of the data transmission or communication with other entities, hence generally between the macro-simulation steps. The non-real-time-capable sub-simulation has a virtual second simulation time coupled to the first simulation time. The second simulation time is virtual inasmuch as it can differ from the real time, even at the predetermined points in time of the data transmission/communication. The second simulation time is coupled to the first simulation time by the means that it is defined in relation to the first simulation time, which is to say that it stands in relationship with the real time of the real-time-capable sub-simulation. At the start of the real-time-capable simulation, the first simulation time and the second simulation time agree. This means that the second simulation time starts with the same real time as the first simulation time. The non-real-time-capable sub-simulation operates with the goal of always keeping the second simulation time in agreement with the first simulation time as much as possible.

Real time can be understood in general to mean a time elapsing simultaneously with reality. Increments of real time correspond to equal increments of the time elapsing in reality. For the first simulation time, this means that increments of the first simulation time correspond to equal increments of the time elapsing in reality. A real-time-capable simulation or sub-simulation is capable of delivering deterministic results at least at predetermined points in time.

The real-time-capable sub-simulation and the non-real-time-capable sub-simulation are designed for the communication of simulation data. In other words, the non-real-time-capable sub-simulation and the real-time-capable sub-simulation exchange simulation data while the simulation is being carried out. Here, the behavior of the non-real-time-capable sub-simulation is dependent on the simulation data provided by the real-time-capable sub-simulation, and conversely, the behavior of the real-time-capable sub-simulation is dependent on the simulation data provided by the non-real-time-capable sub-simulation. A bidirectional communication connection exists between the real-time-capable sub-simulation and the non-real-time-capable sub-simulation. The communication takes place at predetermined points in time, which is to say that the real-time-capable sub-simulation and the non-real-time-capable sub-simulation work toward the goal of completing simulation data, and providing it to the other respective sub-simulation, no later than at the predetermined communication times.

As already described above, the non-real-time-capable sub-simulation is not able under all circumstances to provide the simulation data by the predetermined communication times. If the non-real-time-capable sub-simulation has not completed any calculated simulation data for the pending macro-simulation step and provided it to the real-time-capable sub-simulation, then estimated simulation data is created for the pending macro-simulation step and are used by the real-time-capable sub-simulation for the pending macro-simulation step. The phrase "not any calculated simulation data has been completed and provided" means that the calculated simulation data desired at the given point in time has not been completed on time. So as not to jeopardize the real-time processing of the real-time-capable sub-simulation, estimated simulation data is used as a substitute.

The setting of the second simulation time to the first simulation time after completion of the calculation of simulation data that was not provided on time means that the virtual, second simulation time is brought into relationship with the first simulation time in accordance with the simulation data that was desired but was not calculated on time. In other words, the virtual, second simulation time is set on the basis of the first simulation time, in particular on the basis of the simulation data of the real-time-capable sub-simulation that is used for the new simulation data that was not calculated on time. In completing the calculation of simulation data that was not provided on time, even though the second simulation time is set on the basis of the first simulation time, as a general rule it is not yet brought into agreement with the first simulation time. Nevertheless, the setting of the second simulation time to the first simulation time after completion of the calculation of simulation data that was not provided on time opens up the possibility of catching up in the calculation of simulation data and bringing the second simulation time into agreement with the first simulation time for the next macro-simulation step or for one of the next macro-simulation steps. Moreover, the setting of the second simulation time represents a signal or a component for measuring the degree to which the non-real-time-capable sub-simulation is lagging behind real time.

Even if the calculated simulation data for the pending macro-simulation step has been completed on time and provided to the real-time-capable sub-simulation, the second simulation time is set to the first simulation time. In this case, the setting of the second simulation time to the first simulation time indicates that the virtual second simulation time is in agreement with the first simulation time and that the calculated simulation data has been provided in accordance with real-time requirements.

According to an embodiment, the creation of estimated simulation data takes place on the basis of earlier simulation data provided by the non-real-time-capable sub-simulation. In other words, estimated simulation data can be generated on the basis of simulation data that has been calculated by the non-real-time-capable sub-simulation for previous macro-simulation steps. It may be the case here that this earlier simulation data, in turn, was provided on time or was not provided on time. The estimated simulation data can be created from the earlier simulation data alone, or from the earlier simulation data with the aid of additional data and/or boundary conditions. It is also possible that the estimated simulation data is created in another way without the use of earlier simulation data, as discussed below.

The co-simulation can have several real-time-capable sub-simulations and/or several non-real-time-capable sub-simulations. The communication between the real-time-capable sub-simulation(s) and the non-real-time-capable sub-simulation(s), as described above, can take place within any subgroup of the sub-simulation.

The second simulation time can be coupled with the first simulation time through time stamps, wherein the real-time-capable sub-simulation generates first time stamps, and each first time stamp indicates the first simulation time, and wherein the non-real-time-capable sub-simulation generates second time stamps when completing the calculation of calculated simulation data. The time stamps can be coupled or appended to simulation data or be packaged together with simulation data in a data packet. In this way, the real-time-capable sub-simulation and the non-real-time-capable sub-simulation can each transmit simulation data together with time stamps to the other respective sub-simulation. In other words, the simulation data can be provided in each case with a time stamp that indicates the completion time of the simulation data or makes it possible to infer the simulation data that was used.

The setting of the second simulation time to the first simulation time can include a generation of a second time stamp that is set to the first simulation time of the last simulation data received by the real-time-capable sub-simulation and used for the calculation, or that is set to the first simulation time of the last simulation data received by the real-time-capable sub-simulation and used for the calculation, incremented by a predetermined time adjustment value. Thus, the second time stamp indicates which of the simulation data received by the real-time-capable sub-simulation has been used. From this, the real-time-capable sub-simulation and/or an error handling system can infer whether calculated simulation data that has been provided is on time for the pending macro-simulation step. In this process, the second time stamp can be set to the time stamp of the last simulation data of the real-time-capable sub-simulation that was used, by which means the real-time-capable sub-simulation can determine through simple comparison whether the last simulation data provided to the non-real-time-capable sub-simulation was used. It is also possible for the non-real-time-capable sub-simulation to increment, by a predetermined time adjustment value, the first time stamp of the last simulation data that was received and used by the real-time-capable sub-simulation. In particular, the predetermined time adjustment value can be of such a nature that the second time stamp agrees with the anticipated first simulation time upon receipt of the simulation data provided by the non-real-time-capable sub-simulation. In this way, the real-time-capable sub-simulation can determine through the comparison of the second time stamp with the current first simulation time whether the data is simulation data that was provided on time.

The non-real-time-capable sub-simulation can have an input data buffer, and the real-time-capable sub-simulation writes simulation data into the input data buffer of the non-real-time-capable sub-simulation, wherein the second simulation time is brought into agreement with the first simulation time by the means that all simulation data written into the input data buffer is used for the completion of calculated simulation data, and calculated simulation data is provided on time for the next pending macro-simulation step. Consequently, the non-real-time-capable sub-simulation indicates, by bringing the second simulation time into agreement with the first simulation time, that the input data buffer of the non-real-time-capable sub-simulation has been processed, i.e., is empty, and the non-real-time-capable sub-simulation has caught up in the calculation of simulation data enough that calculated simulation data is provided as desired for the pending macro-simulation step. This catching-up to the first simulation time can also be referred to as synchronization or resynchronization.

In an embodiment, only simulation data that has been completed on time may be provided to the real-time-capable sub-simulation from the non-real-time-capable sub-simulation. In this way, it is evident to the real-time-capable sub-simulation merely from the presence or absence of newly calculated simulation data whether a delay is present or not. The calculated simulation data that has not been completed on time can be provided to an error handling system. It is also possible that all simulation data calculated by the non-real-time-capable sub-simulation, regardless of whether it is on time or delayed, is forwarded to the error handling system. In this case, the error handling system has a large database, e.g., for the creation of estimated simulation data. The forwarding or provision can be followed by a test on the part of the real-time-capable sub-simulation as to whether simulation data was provided on time.

The provision of only the simulation data that has been completed on time can be preceded here by the non-real-time-capable sub-simulation testing, immediately before potentially sending the simulation data to the real-time-capable sub-simulation, whether the simulation data can be provided to the real-time-capable sub-simulation on time. If the result of the test is that it is not possible to provide the simulation data on time for the real-time-capable sub-simulation, then the simulation data is transmitted directly to the error handling system.

The co-simulation can have an error handling system. The error handling system can be part of the real-time-capable sub-simulation. It is also possible that the error handling system is separate from the real-time-capable sub-simulation and the non-real-time-capable sub-simulation, and is connected to the real-time-capable sub-simulation and to the non-real-time-capable sub-simulation.

Also, if the non-real-time-capable sub-simulation has not provided any calculated simulation data for the pending macro-simulation step, provision after the fact of the calculated simulation data for the pending macro-simulation step to the real-time-capable sub-simulation and/or to an error handling system. The fact that the non-real-time-capable sub-simulation has not provided any calculated simulation data for the pending macro-simulation step may be caused by a computing power-induced delay in the non-real-time-capable sub-simulation. It is also possible, however, that the delay has occurred for a different reason. It is ensured by means of the after-the-fact provision of the calculated simulation data that the calculated simulation data, despite not being on time, is forwarded, and a complete set of calculated simulation data is thus present in the real-time-capable sub-simulation and/or in the error handling system. Moreover, the extent to which the non-real-time-capable sub-simulation has processed the simulation data of the real-time-capable sub-simulation is documented or signaled in this way.

An estimation error can be calculated from the estimated simulation data for the pending macro-simulation step and the calculated simulation data that was provided after the fact for the pending macro-simulation step, and after-the-fact adjustment of the real-time-capable sub-simulation on the basis of the estimation error and/or adjustment of the creation of estimated simulation data for later macro-simulation steps. In other words, the estimation error can be used to improve simulation results after the fact and/or to ensure that estimated simulation data that is required later is the result of a better estimate. In other words, the estimation error can be used to improve the later simulation. The adjustment of the creation of estimated simulation data for later macro-simulation steps means that the algorithm of the creation of estimated simulation data is adjusted on the basis of the estimation error and this adjusted algorithm is used later when estimated simulation data is again required. The calculation of the estimation error and the adjustment of the creation of estimated simulation data can take place in the real-time-capable sub-simulation or in an error handling system, or partially in the real-time-capable sub-simulation and partially in the error handling system. It is also possible for the calculation of the estimation error and the adjustment of the creation of estimated simulation data to take place entirely or partially in the non-real-time-capable sub-simulation.

If the non-real-time-capable sub-simulation has not provided any calculated simulation data for the pending macro-simulation step, immediate creation of calculated simulation data for one or more of the macro-simulation step(s) following the pending macro-simulation step, wherein the immediate creation of calculated simulation data is carried out until calculated simulation data is provided on time to the real-time-capable sub-simulation. The immediate creation of calculated simulation data can make it possible for the non-real-time-capable sub-simulation to catch up to the first simulation time as quickly as possible. The immediate creation of calculated simulation data for one or more of the macro-simulation step(s) following the pending macro-simulation step means that the non-real-time-capable sub-simulation uses essentially all available computing capacity for catching up to the first simulation time. For example, it is possible to not relinquish any computing time through idle or sleep states.

The non-real-time-capable sub-simulation can have a computing power, and, if applicable, additional characteristics establishing real-time capability, that provides the calculated simulation data on time when averaged over the entire course of the simulation. The term "on time" relates to the timeliness or lateness relative to the applicable pending simulation step of the real-time-capable sub-simulation. The expression "on time when averaged over the entire course of the simulation" means that the delta between the completion time of the calculated simulation data and the point in time at which the real-time-capable sub-simulation needs the calculated simulation data is negative on average. In other words, the non-real-time-capable sub-simulation is, on average, finished with the calculation of the simulation data faster than exactly on time. Expressed in still another way, the sum of all calculation times of the non-real-time-capable sub-simulation is less than the elapsed real time of the simulation. In this way, the non-real-time-capable sub-simulation is capable, by means of its computing power, of making up the delay in the case of simulation data that has not been completed on time and of bringing the second simulation time into agreement with the first simulation time without omitting calculations of simulation data. The non-real-time-capable sub-simulation can also have a computing power that permits on-time provision of the calculated simulation data to the real-time-capable sub-simulation for average complexity of the creation of the calculated simulation data. Thus, the computing power of the non-real-time-capable sub-simulation can also be defined with respect to a macro-simulation step.

The real-time-capable sub-simulation can check at every macro-simulation step or at every nth macro-simulation step or at a predetermined, partially regular sequence of macro-simulation steps whether the non-real-time-capable sub-simulation has provided calculated simulation data for the applicable pending macro-simulation step. In this way, it is possible to determine in advance the intervals with respect to the predefined macro-step sizes at which a data transmission from the non-real-time-capable sub-simulation to the real-time-capable sub-simulation should take place, thereby also precisely predefining the points in time at which it is determined whether or not a delay is present. The variable n is an integer, e.g., 2, 3, 4, 5, 6, 7, 8, etc.

The creation of estimated simulation data may be carried out in the real-time-capable sub-simulation and/or in the non-real-time-capable sub-simulation and/or in an error handling system. In other words, the creation of estimated simulation data can be an inherent part of the real-time-capable sub-simulation or can be an inherent part of the non-real-time-capable sub-simulation or can be implemented in a separate error handling system or can be split between any combination of two of the three said entities, e.g., between the real-time-capable sub-simulation and the error handling system, or be split between all three said entities. Consequently, it is possible to determine where the estimated simulation data is created depending on the application, for example depending on the available computing capacity in the real-time-capable sub-simulation.

The creation of estimated simulation data can include an extrapolation of the estimated simulation data from earlier calculated simulation data made available by the non-real-time-capable sub-simulation, in particular extrapolation of the zeroth, first, or second order; derivation of the estimated simulation data from a characteristic curve or from a characteristic map; creation of the estimated simulation data on the basis of earlier simulations; limiting the estimated simulation data to predetermined minimum and/or maximum values; aligning the estimated simulation data with a predetermined change dynamic; and taking internal states of the real-time-capable system into account. The steps are possibilities for creating the estimated simulation data with different degrees of accuracy and different degrees of complexity. The steps cover a wide spectrum of complexity, ranging from very low complexity, e.g., pure zeroth order extrapolation, to medium complexity, e.g., extrapolation of the first order and limiting the estimated simulation data to predetermined minimum and maximum values, all the way to very complex estimation systems, which, for example, take into account a multiplicity of internal states of the real-time-capable system and derive from that which simulation data can be expected on the basis of the early simulation data. The creation of estimated simulation data can be adjusted especially effectively in this way to the individual case of the real-time-capable simulation for control unit development. Derivation of the estimated simulation data from a characteristic curve or a characteristic map can make possible the creation of the estimated simulation data without processing earlier calculated simulation data made available by the non-real-time-capable sub-simulation. For the example of an engine simulation as non-real-time-capable sub-simulation, certain current states of the engine can be estimated from other current circumstances by means of characteristic maps. The creation of the estimated simulation data on the basis of earlier simulations incorporates empirical values regarding the behavior of sub-simulations from earlier simulation runs, which also permits good estimates.

Further, cases can be logged in which the non-real-time-capable sub-simulation has not completed any calculated simulation data for the pending macro-simulation step and provided it to the real-time-capable sub-simulation. Due to the logging, it is possible to determine after the conclusion of the simulation whether and the extent to which the simulation needed to make use of estimated simulation data. In consequence, a measure for the reliability of the simulation results can be provided. It is also possible to adjust simulation components on the basis of this knowledge for further simulation passes, and thus to ensure high simulation quality. The logging can be accomplished in any desired form, for example by outputting or storing the cases. In particular, the logging can have a documentation of the points in time and/or the number of the cases.

The real-time-capable sub-simulation simulates an environment of a control unit and the non-real-time-capable sub-simulation simulates a control unit. The real-time-capable sub-simulation here can simulate, in particular, a technical system to be controlled. In this way, an implementation of a control unit that is quite rudimentary in terms of the model, and is not yet real-time-capable, can be tested in its environment at a very early point in control unit development, with the conditions quite closely approaching a real time test.

The real-time-capable sub-simulation simulates a first part of an environment of a control unit and the non-real-time-capable sub-simulation simulates a second part of an environment of a control unit. In this design, the real-time-capable sub-simulation can simulate a first part of a system to be controlled and the non-real-time-capable sub-simulation can simulate a second part of a technical system to be controlled. It is also possible that the real-time-capable sub-simulation simulates a technical system to be controlled and the non-real-time-capable sub-simulation simulates an environmental component of the technical system to be controlled or of the control unit, or vice versa. In the cases, the real-time-capable simulation can be executed on an HIL simulator or can be an HIL simulator. The HIL simulator can, in particular, be designed for connection to a control unit to be tested, which can either be present already implemented as hardware or can be present as a software model on an external device. In both cases, the control unit can be tested within the framework of the real-time-capable overall simulation on the HIL simulator, wherein the overall simulation on the HIL simulator has at least one non-real-time-capable sub-simulation.

The non-real-time-capable sub-simulation can simulate an environment of a control unit and the real-time-capable sub-simulation simulates a control unit. The non-real-time-capable sub-simulation here can simulate, in particular, a technical system to be controlled.

The non-real-time-capable sub-simulation may be a sub-simulation that is actually real-time-capable and that is connected to the real-time-capable sub-simulation through a non-real-time-capable medium, e.g., through the Internet or through a WLAN.

Also, a a simulation device is provided for control unit development, wherein the simulation device is real-time-capable and simulates a control unit or an environment of a control unit or a combination of a control unit and an environment of the control unit, having a real-time-capable sub-simulation with a first simulation time corresponding to the real time; a non-real-time-capable sub-simulation that interacts with the real-time-capable sub-simulation and that has a virtual, second simulation time that is coupled to the first simulation time and that matches the first simulation time at the start of the real-time-capable simulation; and a communication path that is equipped for an exchange of simulation data between the real-time-capable sub-simulation and the non-real-time-capable sub-simulation. The non-real-time-capable sub-simulation is equipped to provide calculated simulation data to the real-time-capable sub-simulation. The real-time-capable sub-simulation is equipped: to check whether the non-real-time-capable sub-simulation has provided calculated simulation data for a pending macro-simulation step; to use the calculated simulation data for the pending macro-simulation step if the non-real-time-capable sub-simulation has completed calculating simulation data for the pending macro-simulation step and has provided it to the real-time-capable sub-simulation; and to use estimated simulation data for the pending macro-simulation step if the non-real-time-capable sub-simulation has not completed any calculated simulation data for the pending simulation step and provided it to the real-time-capable sub-simulation. The non-real-time-capable sub-simulation is equipped to set the second simulation time to the first simulation time after completing the calculation of simulation data that was not provided on time. The additional features, modifications, and effects that were described above with respect to the method for providing a real-time-capable simulation for control unit development can be applied analogously to the simulation device for control unit development.

The non-real-time-capable sub-simulation can have one or more processors or processor cores, which has or have a computing power that is sufficient to provide the calculated simulation data on time when averaged over the entire course of the simulation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
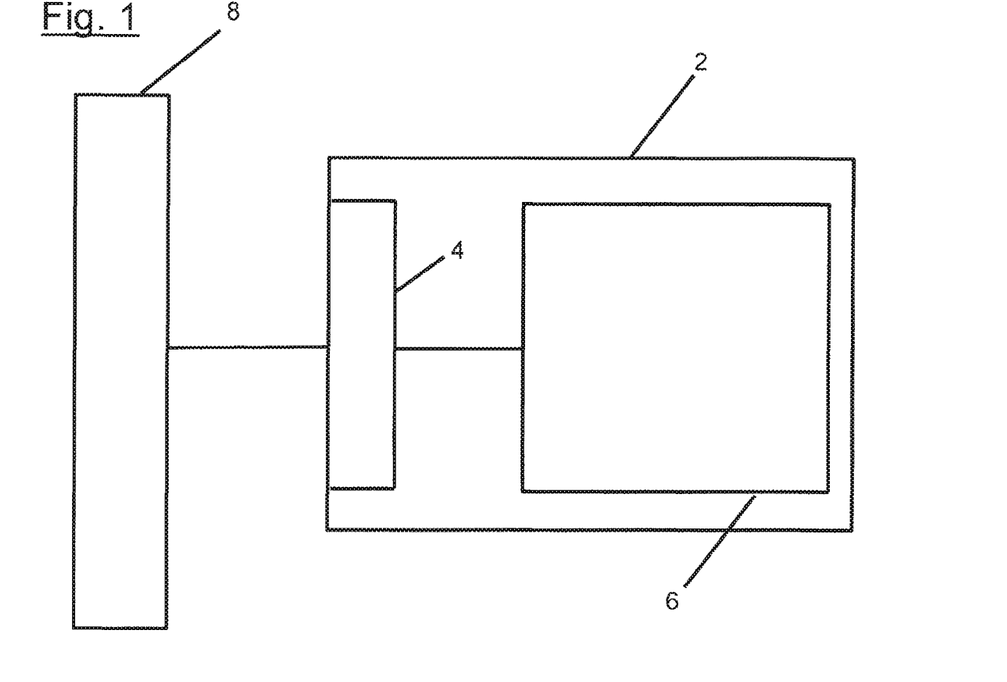
FIG. 1 shows, in a block diagram, a simulation device with a control unit to be tested that is connected thereto, wherein a method for providing a real-time-capable simulation according to exemplary embodiments of the invention can be executed on the simulation device.

FIG. 1 shows a simulation device 2, which can be an HIL simulator 2. The HIL simulator 2 has a physical interface 4, through which external devices can be connected to the HIL simulator 2. In FIG. 1, a control unit 8 is connected to the physical interface 4. In the example from FIG. 1, the control unit 8 is an engine control unit that is equipped to control the engine of a motor vehicle. The HIL simulator 2 is equipped to test the engine control unit 8.

The HIL simulator 2 contains a real-time-capable simulation 6 of a technical system. In the example from FIG. 1, the real-time-capable simulation 6 is a model of a combination of an engine and a transmission. The real-time-capable simulation 6 can also be referred to as a simulation of the environment of the control unit 8 because it simulates the operating environment of the control unit 8, which is to say at least a part of the components that stand in relationship with the control unit 8 during real operation. The real-time-capable simulation 6 is present as a software model, and can exchange data with the physical interface 4. In this way, a data connection is produced between the control unit 8 and the real-time-capable simulation 6, by which means the interaction of these two components can be simulated and tested. In this process, the physical interface 4 takes care of the transition between the physical signals transmitted from and to the control unit and the logical signals, which is to say software-based signals, exchanged within the HIL simulator 2.

The HIL simulator is real-time-capable. Consequently, the control unit 8 can be tested without further adaptation, which is to say in its configuration used in operation later. The HIL simulator 2 interacts in the same speed with the control unit 8 that a physically existing technical system would, in the present case a combination of the real engine and transmission of a motor vehicle. This means, in turn, that the behavior of the real-time-capable simulation 6 with respect to its inputs and outputs vis-à-vis the control unit 8 is also calculated in at least this speed. The real-time-capable simulation 6 is an executable model that can be executed on the hardware of the HIL simulator 2 for testing the control unit 8.

Figure 2:
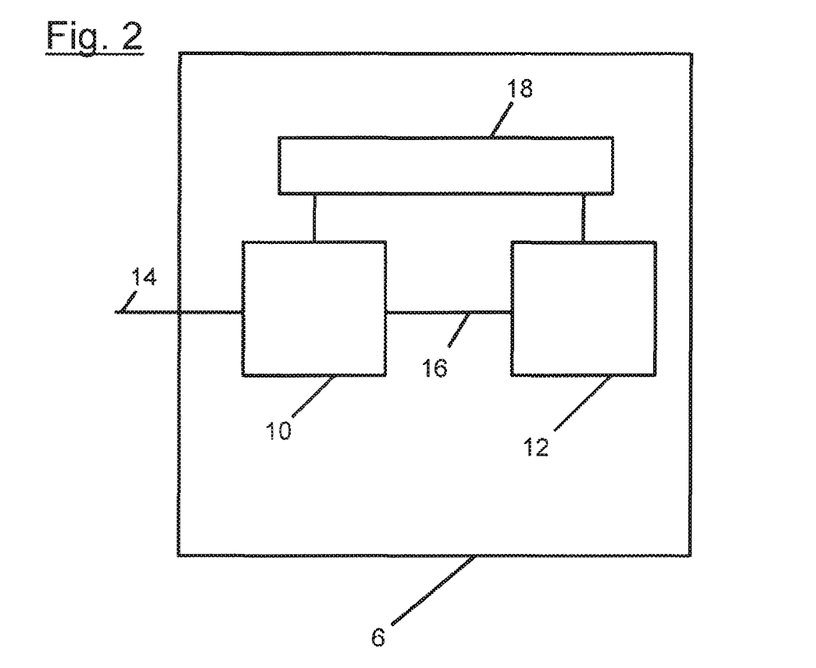
FIG. 2 shows, in a block diagram, a real-time-capable simulation that is provided by a method according to exemplary embodiments of the invention.

FIG. 2 shows the real-time-capable simulation 6 of the technical system from FIG. 1 in greater detail. The real-time-capable simulation 6 has a real-time-capable sub-simulation 10 and a non-real-time-capable sub-simulation 12. The real-time-capable sub-simulation 10 and the non-real-time-capable sub-simulation 12 together form a real-time-capable co-simulation. The real-time-capable sub-simulation 10 simulates the engine that controls the connected control unit 8. Consequently, the real-time-capable simulation 10 simulates the technical system to be controlled. The real-time-capable sub-simulation 10 is connected to the physical interface 4, and consequently to the control unit 8, by the data path 14. The real-time-capable simulation 6 is thus real-time-capable to the outside, which is to say vis-à-vis the control unit 8. The non-real-time-capable sub-simulation 12 simulates the transmission of the motor vehicle. The non-real-time-capable sub-simulation thus simulates an environmental component of the engine or of the engine control unit. The control unit 8 can be tested in combination with the transmission with respect to the engine.

The real-time-capable sub-simulation 10 and the non-real-time-capable sub-simulation 12 are connected by a data path 16 and exchange simulation data through the data path 16. The non-real-time-capable sub-simulation 12 simulates the behavior of the transmission on the basis of the simulation data from the real-time-capable sub-simulation 10, if applicable while incorporating additional inputs from components or while incorporating a sequence of predetermined simulation states. The real-time-capable sub-simulation 10 simulates the behavior of the engine 10 on the basis of the simulation data of the non-real-time-capable sub-simulation 12 and the inputs of the control unit 8, if applicable while incorporating additional inputs from components that or while incorporating a sequence of predetermined simulation states. Furthermore, the real-time-capable sub-simulation 10 receives additional data from the error handling system 18, as described below.

In the present example, the real-time-capable sub-simulation 10 and the non-real-time-capable sub-simulation 12 are executed on separate processors during the simulation. In this way, the calculations for the real-time-capable sub-simulation 10 and the non-real-time-capable sub-simulation 12 can be executed completely in parallel. It is also possible that the real-time-capable sub-simulation 10 and the non-real-time-capable sub-simulation 12 are executed on the same processor, but in separate processor cores. Moreover, it is possible that the real-time-capable sub-simulation 10 and the non-real-time-capable sub-simulation 12 have different address spaces, wherein they are executed on the same processor or on different processors.

To provide the clearest possible illustration of an exemplary embodiment of the invention, only the real-time-capable sub-simulation 10 and the non-real-time-capable sub-simulation 12 are shown in FIG. 2. It is evident to the person skilled in the art, however, that additional sub-simulations, both real-time-capable and non-real-time-capable, from which the real-time-capable simulation 6 can be constructed, may be present in the HIL simulator.

The real-time-capable simulation 6 additionally has an error handling system 18. The non-real-time-capable sub-simulation 12 transmits to the error handling system 18 simulation data that was calculated for the real-time-capable sub-simulation 10 but was not completed on time. Simulation data that was completed on time for the real-time-capable sub-simulation 10 is transmitted both to the real-time-capable sub-simulation 10 and to the error handling system 18. For the case when the non-real-time-capable sub-simulation 12 has not completed any calculated simulation data on time for the real-time-capable sub-simulation 10, the error handling system 18 transmits estimated simulation data to the real-time-capable sub-simulation 10. An exemplary simulation data flow between the real-time-capable sub-simulation 10, the non-real-time-capable sub-simulation 12, and the error handling system 18 is described in detail below. It is emphasized that the error handling system can also be integrated into the real-time-capable sub-simulation 10 or the non-real-time-capable sub-simulation 12, which is to say can be an integral constituent of one of the sub-simulations, or can also be split between the two sub-simulations with regard to its functionality.

Figure 3:
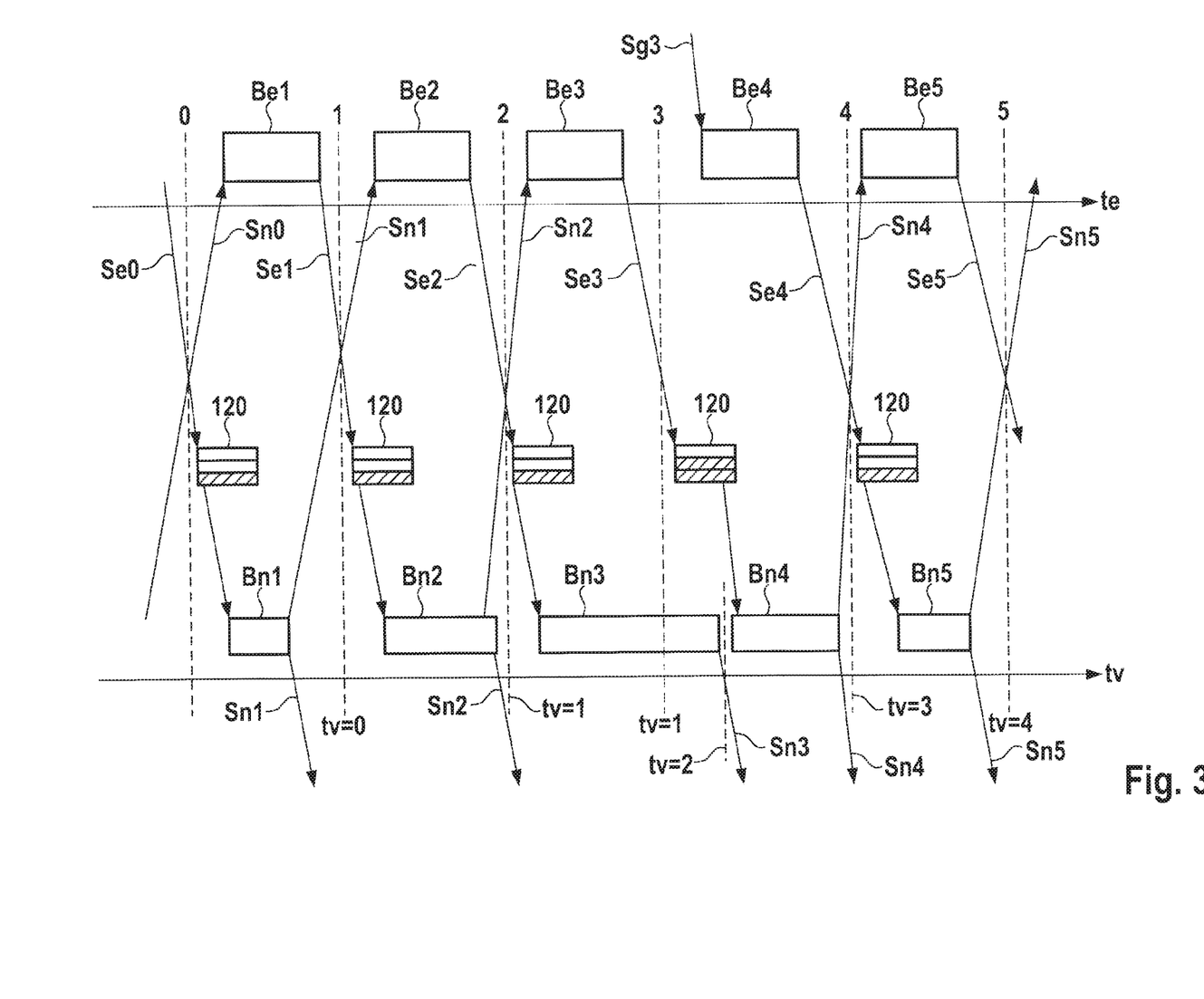
FIG. 3 shows, in a flow diagram, the data flow between a real-time-capable sub-simulation and a non-real-time-capable sub-simulation in a method for providing a real-time-capable simulation according to an exemplary embodiment.

FIG. 3 illustrates the data exchange between a real-time-capable sub-simulation, as for example the real-time-capable sub-simulation 10 from FIG. 2, and a non-real-time-capable sub-simulation, as for example the non-real-time-capable sub-simulation 12 from FIG. 2, and an error handling system, as for example the error handling system 18 from FIG. 2. The data exchange illustrated relates to five macro-simulation steps during the execution of a simulation. The mechanisms illustrated enable the provision of a simulation that is real-time-capable as a whole. Consequently, the method illustrated in FIG. 3 is a method for providing a real-time-capable simulation for control unit development according to an exemplary embodiment of the invention.

FIG. 3 shows two time axes. The first simulation time te of the real-time-capable sub-simulation is plotted in the upper region of FIG. 3. The label te indicates that the first simulation time matches the real time. In FIG. 3, five macro-simulation steps are shown. The time is indicated in dimensionless form, as the length of one macro-simulation step. Consequently, the time axis shown in FIG. 3 for the first simulation time runs from 0 to 5. The boundaries between the macro-simulation steps, which is to say the integer time intervals, are indicated in FIG. 3 by dashed lines. During the individual macro-simulation steps, the real-time-capable sub-simulation simulates the behavior of the simulated entity in each case, for example of the engine in the above-described example from FIGS. 1 and 2. The applicable calculations are represented as blocks in FIG. 3, with the calculation in the first simulation step being labeled Be1, the calculation in the second macro-simulation step being labeled Be2, the calculation in the third macro-simulation step being labeled Be3, the calculation in the fourth macro-simulation step being labeled Be4, and the calculation in the fifth macro-simulation step being labeled Be5. The real-time-capable sub-simulation is real-time-capable by definition, so the calculations of the applicable macro-simulation step are always completed within the time limits of the macro-simulation step.

The second simulation time tv is plotted in the lower region of FIG. 3. The second simulation time tv is the simulation time of the non-real-time-capable sub-simulation. Since the second simulation time is not directly coupled to real time, but only indirectly through the first simulation time te, it is also referred to as virtual simulation time tv. In the applicable macro-simulation steps, the non-real-time-capable sub-simulation simulates the behavior of the underlying system, e.g., of the transmission in the above-described example from FIGS. 1 and 2. The calculations associated with the first macro-simulation step are labeled Bn1, the calculations associated with the second macro-simulation step are labeled Bn2, the calculations associated with the third macro-simulation step are labeled Bn3, the calculations associated with the fourth macro-simulation step are labeled Bn4, and the calculations associated with the fifth macro-simulation step are labeled Bn5. The calculations are labeled as belonging to a specific macro-simulation step because the non-real-time-capable sub-simulation attempts to execute the calculations in the given macro-simulation step. Since the non-real-time-capable sub-simulation is not real-time-capable by definition, however, the calculations may also shift into other macro-simulation steps, as is discussed in detail below.

The real-time-capable sub-simulation and the non-real-time-capable sub-simulation exchange simulation data with one another during the execution of the simulation. The data created by the real-time-capable sub-simulation in the first macro-simulation step and transmitted to the non-real-time-capable sub-simulation is labeled Se1, and is illustrated by a corresponding arrow in FIG. 3. The simulation data created in the second macro-simulation step by the real-time-capable sub-simulation and provided to the non-real-time-capable sub-simulation is labeled Se2, etc. In all, six sets of simulation data Se0, Se1, Se2, Se3, Se4, and Se5 provided by the real-time-capable sub-simulation are shown in FIG. 3. Analogously, the simulation data of the non-real-time-capable sub-simulation calculated in the calculation associated with the first macro-simulation step is labeled Sn1, the simulation data of the non-real-time-capable sub-simulation calculated in the calculation associated with the second macro-simulation step is labeled Sn2, etc. In all, six sets of simulation data Sn0, Sn1, Sn2, Sn3, Sn4 and Sn5 provided by the non-real-time-capable sub-simulation are shown in FIG. 3.

In the exemplary embodiment from FIG. 3, the non-real-time-capable sub-simulation has an input data buffer 120. The filling of this input data buffer 120 is illustrated for each macro-simulation step in FIG. 3. In particular, it is illustrated here that the simulation data provided by the real-time-capable sub-simulation is first written into the input data buffer 120 before it is used for the calculation in the non-real-time-capable sub-simulation. The real-time-capable sub-simulation can likewise have an input data buffer.

The execution of the simulation, in particular the data flow between the real-time-capable sub-simulation and the non-real-time-capable sub-simulation, is described below with reference to FIG. 3 along the time axes shown. Around the time 0, the real-time-capable sub-simulation receives simulation data Sn0 from the non-real-time-capable sub-simulation, and the non-real-time-capable sub-simulation receives simulation data Se0 from the real-time-capable sub-simulation. The time 0 is arbitrarily labeled with the value 0. This point in time can also be any intermediate time during the execution of the simulation. The point in time could thus in general also be designated i or any other generic variable. It is only important that there is a reference time for the subsequent macro-simulation steps. At the time 0, the second simulation time agrees with the first simulation time, which is to say that the real-time-capable sub-simulation and the non-real-time-capable sub-simulation exchange simulation data as desired at this coupling time. In general, all times 0, 1, 2, 3, 4 and 5 labeled with dashed lines are intended as coupling times for exchanging simulation data.

In the first macro-simulation step, which is to say in the time interval between te=0 and te=1, the real-time-capable sub-simulation processes the simulation data Sn0 calculated by the non-real-time-capable sub-simulation and creates the simulation data Se1 for transfer to the non-real-time-capable sub-simulation. Together with the calculated simulation data Se1, the real-time-capable sub-simulation transmits a time stamp, which indicates that the first simulation time is 1, which is to say that te=1. In the example in FIG. 3, the non-real-time-capable sub-simulation also manages to process the simulation data Se0 in the first macro-simulation step and to complete calculated simulation data Sn1 and provide it to the real-time-capable sub-simulation. After completing the calculated simulation data Sn1, the non-real-time-capable sub-simulation sets the second simulation time tv to the value 0, which is to say to the value of the time stamp of the last simulation data received by the real-time-capable sub-simulation. In addition, the non-real-time-capable sub-simulation deletes the simulation data used from the input data buffer 120, causing the input data buffer 120 to be empty as a consequence of the completion of the calculated simulation data Sn1. The empty state of the input data buffer 120 and the setting of the second simulation time to the value 0 indicate that the non-real-time-capable sub-simulation is behaving in a real-time-capable manner at the coupling time 1 and that the second simulation time is in agreement with the first simulation time.

Alternatively, the non-real-time-capable sub-simulation can also be configured such that the time stamp of the last simulation data received by the real-time-capable sub-simulation is incremented by 1 so that the second simulation time would also be set to the value 1 at the coupling time 1. Since the system as a whole knows whether or not such an incrementing takes place, the same information arrives at the real-time-capable sub-simulation in both cases, namely that the non-real-time-capable sub-simulation is behaving in a real-time-capable manner for the moment.

In addition to transmitting the calculated simulation data Sn1 to the real-time-capable sub-simulation, the non-real-time-capable sub-simulation transmits the calculated simulation data Sn1 to the error handling system as well, which is illustrated by the downward-pointing arrow in FIG. 3. Because of the time stamp of tv=0, which is linked to the calculated simulation data Sn1, the error handling system knows that the calculated simulation data Sn1 was transmitted on time to the real-time-capable sub-simulation. Accordingly, no error handling is necessary at this point in time.

In the present example from FIG. 3, the second macro-simulation step, which is to say the time interval between te=1 and te=2, proceeds analogously to the first macro-simulation step.

On the part of the real-time-capable sub-simulation, the third macro-simulation step, which is to say the time interval between te=2 and te=3, likewise proceeds analogously to the first and second macro-simulation steps. However, in the third macro-simulation step in the present example from FIG. 3, the non-real-time-capable sub-simulation does not manage to complete the calculated simulation data Sn3 within the third macro-simulation step and to provide it to the real-time-capable sub-simulation. Consequently, the second simulation time at the end of the third macro-simulation step remains at the value 1, which is to say tv=1. The real-time-capable sub-simulation determines in its check whether the non-real-time-capable sub-simulation has provided the calculated simulation data Sn3 that this provision has not occurred. The error handling system has also ascertained this, because no calculated simulation data Sn3 has arrived in the error handling system by the time 3.

The error handling system therefore creates estimated simulation data Sg3 for the fourth macro-simulation step, on the basis of the previously calculated simulation data Sn1 and Sn2. This estimated simulation data Sg3 is made available to the real-time-capable sub-simulation for the calculation Be4 in the fourth macro-simulation step. Consequently, the real-time-capable sub-simulation can include the calculation Be4 in the fourth macro-simulation step without delay. It is ensured by this means that the real-time-capable sub-simulation produces output data at the end of the fourth macro-simulation step within the framework of its real-time requirements.

The error handling system estimates the estimated simulation data Sg3 on the basis of the previously calculated simulation data Sn1 and Sn2. The estimated simulation data can be generated in a variety of ways. For example, it is possible that a linear or quadratic extrapolation, which is to say a first or second order extrapolation, is created on the basis of the previously calculated simulation data Sn1 and Sn2. If multiple variables are passed, the extrapolation can take place individually for each variable. It is also possible, however, that interactions between the individual variables are taken into consideration and incorporated into the estimation. Moreover, additional information, as for example a limiting of the value range of the simulation data, can be taken into account or the states of the real-time-capable sub-simulation can be taken into account, or other measures, as described above, may be taken.

The simulation data Se3 calculated in the third macro-simulation step by the real-time-capable sub-simulation is written into the input data buffer 120 of the non-real-time-capable sub-simulation at the time 3. Since the calculation Bn3 of the non-real-time-capable sub-simulation associated with the third macro-simulation step has not yet been completed at this point in time and the data used for it has not yet been deleted from the input data buffer 120, there are now two sets of simulation data present in the input data buffer 120.

In the present example, the non-real-time-capable sub-simulation finishes the calculation Bn3 associated with the third macro-simulation step sometime in the middle of the fourth macro-simulation step. As a consequence of this, the second simulation time is set to the value 2, which is to say tv=2, and the simulation data Se2 calculated in the second macro-simulation step by the real-time-capable sub-simulation is deleted from the input data buffer 120.

The calculated simulation data Sn3 that was completed late is transmitted to the error handling system. The error handling system thereupon compares the estimated simulation data Sg3 with the calculated simulation data Sn3. From the comparison of the estimated simulation data Sg3 and the calculated simulation data Sn3, the error handling system draws conclusions about the quality of the estimation. If necessary, the error handling system adjusts the algorithm for the creation of estimated simulation data for later macro-simulation steps. In this way, a large amount of data is made available to the error handling system through a feedback loop, by which means the creation of estimated simulation data, and thus the accuracy of the simulation, can be improved.

The simulation data Se3 is still present in the input data buffer 120 at the point in time when the calculated simulation data Sn3 is completed. This is the signal for the non-real-time-capable sub-simulation to immediately undertake the next calculation step, which is to say to immediately undertake the calculation Bn4 associated with the fourth macro-simulation step. In the example from FIG. 3, the non-real-time-capable sub-simulation is able to finish the calculation Bn4 before the time 4 so that the input data buffer 120 is emptied by the time 4 and the second simulation time is set to the value 3, which is to say tv=3. In other words, the non-real-time-capable sub-simulation manages to catch up to the real-time-capable sub-simulation within the fourth macro-simulation step, and to provide the calculated simulation data Sn4 on time for the following macro-simulation step. The second simulation time is brought into agreement with the first simulation time, which is to say the non-real-time-capable sub-simulation is synchronized or resynchronized with the real-time-capable sub-simulation.

The fifth macro-simulation step, which is to say the time interval between te=4 and te=5, then proceeds analogously to the first and second macro-simulation steps again.

Figure 4A:
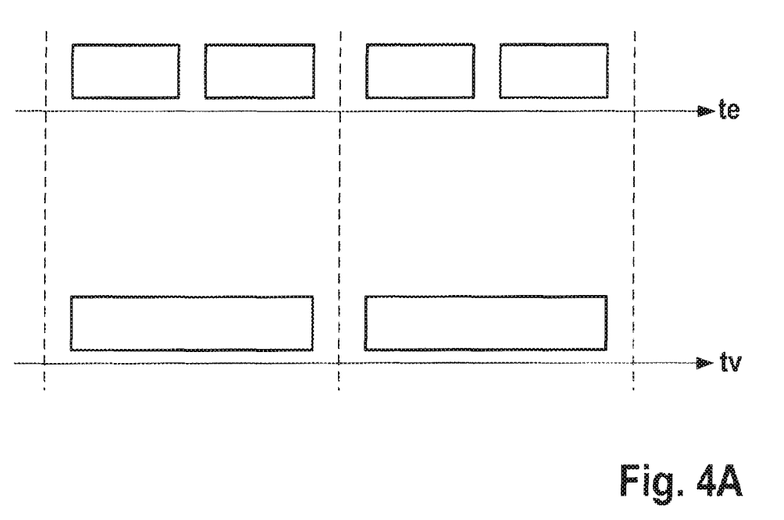
FIGS. 4a to 4c illustrate different patterns of coupling points between a real-time-capable sub-simulation and a non-real-time-capable sub-simulation, such as may occur in methods according to exemplary embodiments of the invention.
Figure 4B:
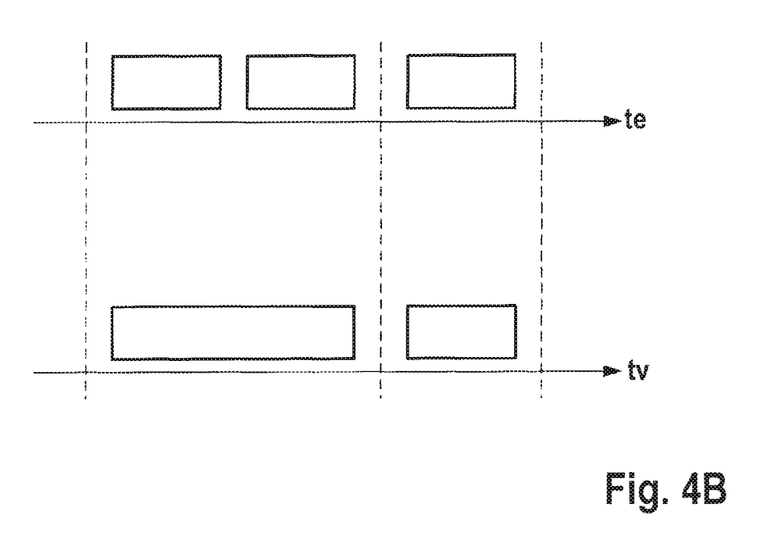
Figure 4C:
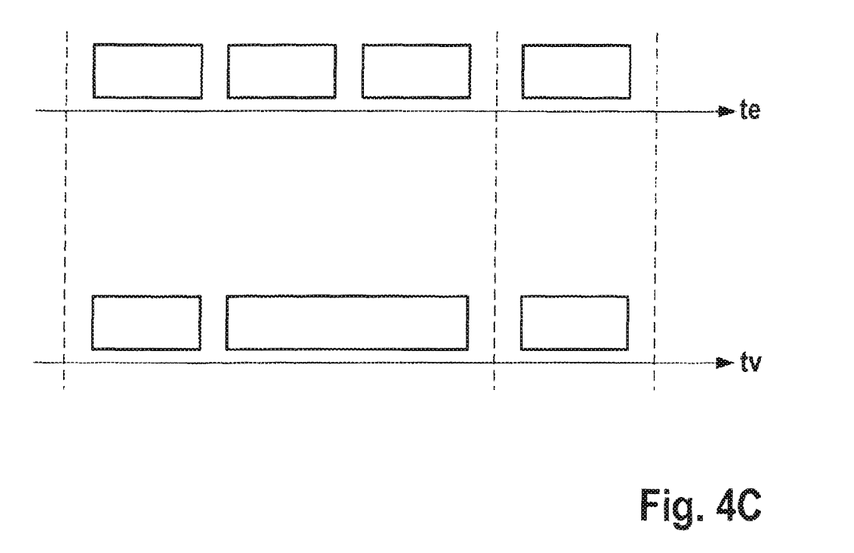

In FIGS. 4A, 4B, and 4C, different patterns of coupling points between a real-time-capable sub-simulation and a non-real-time-capable sub-simulation are illustrated, such as may be present in methods according to exemplary embodiments of the invention. The data flow between the real-time-capable sub-simulations, shown on the top in each case, and the non-real-time-capable sub-simulations, shown on the bottom in each case, is not shown in FIG. 4. It is a matter of course that the data exchange can take place according to the pattern in FIG. 3 and that the behavior of the system as a whole when simulation data is not provided on time by the non-real-time-capable sub-simulation is analogous to the behavior described with reference to FIG. 3.

In FIG. 4A, the macro-simulation steps of the real-time-capable sub-simulation are normally half as long as the macro-simulation steps of the non-real-time-capable sub-simulation. From the perspective of the real-time-capable sub-simulation, the exchange of simulation data thus takes place after every other macro-simulation step. The coupling points are indicated with dashed lines in FIG. 4A as well.

In FIG. 4B, the sequence of the macro-simulation steps of the real-time-capable sub-simulation corresponds to the sequence in FIG. 4A, even if only three macro-simulation steps are shown instead of four. In the non-real-time-capable sub-simulation, every other macro-simulation step is approximately twice as long as the preceding macro-simulation step. In other words, comparatively short and comparatively long macro-simulation steps alternate in the non-real-time-capable sub-simulation. The pattern shown continues cyclically. From the perspective of the real-time-capable sub-simulation, the data exchange takes place alternately after two and after one macro-simulation step. The real-time-capable sub-simulation checks, in this pattern, whether the non-real-time-capable sub-simulation has completed calculating simulation data and has provided it to the real-time-capable sub-simulation.

FIG. 4C shows another example of a possible sequence of macro-simulation steps in the non-real-time-capable sub-simulation. Here, too, the pattern that is shown continues cyclically. A comparatively long macro-simulation step of the non-real-time-capable sub-simulation is followed by two comparatively short macro-simulation steps. From the perspective of the real-time-capable sub-simulation, the data exchange takes place after three and after one macro-simulation step alternately. The real-time-capable sub-simulation checks, in this pattern, whether the non-real-time-capable sub-simulation has completed calculating simulation data and has provided it to the real-time-capable sub-simulation.

FIGS. 4A, 4B, and 4C illustrate that the coupling points between the real-time-capable sub-simulation and the non-real-time-capable sub-simulation can be defined in a variety of different ways. Depending on the predetermined pattern, the real-time-capable sub-simulation and the non-real-timecapable sub-simulation know at which points in time they are supposed to transmit simulation data and at which points in time the real-time-capable sub-simulation should check whether the non-real-time-capable sub-simulation has provided simulation data. Error handling proceeds as described above with reference to FIG. 3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for providing a real-time-capable simulation for control unit development, the real-time-capable simulation simulates a control unit or an environment of the control unit or a combination of the control unit and the environment of the control unit, the real-time-capable simulation comprises a co-simulation of a real-time-capable sub-simulation and a non-real-time-capable sub-simulation that interacts with the real-time-capable sub-simulation, the real-time-capable sub-simulation and the non-real-time-capable sub-simulation being adapted for communication of simulation data, the real-time-capable sub-simulation has a first simulation time corresponding to real time and the non-real-time-capable sub-simulation has a virtual, second simulation time that is coupled to the first simulation time and that matches the first simulation time at a start of the real-time-capable simulation, the method comprising:
    checking, by the real-time-capable sub-simulation, whether the non-real-time-capable sub-simulation has provided calculated simulation data Sn for a pending macro-simulation step at a given time and determining a check result of
        provided when the non-real-time-capable sub-simulation has provided the calculated simulation data Sn for the pending macro-simulation step at the given time and
        not provided when the non-real-time-capable sub-simulation has not provided the calculated simulation data Sn for the pending macro-simulation step at the given time;
    when the check result is determined to be the provided, using, by the real-time-capable sub-simulation, the calculated simulation data Sn for the pending macro-simulation step such that upon determining that the non-real-time-capable sub-simulation has completed calculating the calculated simulation data Sn for the pending macro-simulation step and has provided the calculated simulation data Sn to the real-time-capable sub-simulation, the calculated simulation data Sn is used for the pending macro-simulation step;
    when the check result is determined to be the not provided, creating estimated simulation data Sq for use in the pending macro-simulation step such that upon determining that the non-real-time-capable sub-simulation has not completed calculating any calculated simulation data Sn for the pending macro-simulation step and has not provided the calculated simulation Sn data to the real-time-capable sub-simulation, the estimated simulation data Sg is created;
    when the check result is determined to be the not provided, setting the second simulation time to the first simulation time after completion of a calculation of the calculated simulation data Sn that was not provided by the given time; and
    when the check result is determined to be the provided, after the pending macro-simulation step, providing the calculated simulation data Sn for the pending macro-simulation step to the real-time-capable sub-simulation and to an error handling system.

2. The method according to claim 1,
    wherein the second simulation time is coupled with the first simulation time through time stamps,
    wherein the real-time-capable sub-simulation generates first time stamps, and each first time stamp indicates the first simulation time at a first simulation time point,
    wherein the non-real-time-capable sub-simulation generates second time stamps when completing the calculation of the calculated simulation data, and
    wherein the setting of the second simulation time to the first simulation time includes a generation of a second time stamp that is set to the first simulation time point of a last simulation data received by the real-time-capable sub-simulation and used for the calculation or that is set to the first simulation time point of a last simulation data received by the real-time-capable sub-simulation and used for the calculation, incremented by a predetermined time adjustment value.

3. The method according to claim 1,
    wherein the non-real-time-capable sub-simulation has an input data buffer and the real-time-capable sub-simulation writes simulation data Se into the input data buffer of the non-real-time-capable sub-simulation,
    wherein the second simulation time is brought into agreement with the first simulation time by using all simulation data Se written into the input data buffer for completion of the calculated simulation data Sn, and the calculated simulation data Sn is provided on time for the next pending macro-simulation step.

4. The method according to claim 1, further comprising:
    calculating an estimation error from the estimated simulation data Sq for the pending macro-simulation step and the calculated simulation data Sn that was provided after the pending macro-simulation step for the pending macro-simulation step; and
    after-the-fact adjusting the real-time-capable sub-simulation on the basis of the estimation error or adjustment of the creation of estimated simulation data Sg for later macro-simulation steps.

5. The method according to claim 1, further comprising:
    substantially immediately creating the calculated simulation data Sn for one or more of the macro-simulation step(s) following the pending macro-simulation step,
    wherein the immediate creation of calculated simulation data Sn is carried out until calculated simulation data Sn is provided on time to the real-time-capable sub-simulation.

6. The method according to claim 1, wherein the non-real-time-capable sub-simulation has a computing power that provides the calculated simulation data Sn on time when averaged over the entire course of the simulation.

7. The method according to claim 1, wherein the real-time-capable sub-simulation, at every macro-simulation step or at every nth macro-simulation step or at a predetermined, partially regular sequence of macro-simulation steps, checks whether the non-real-time-capable sub-simulation has provided the calculated simulation data Sn for the applicable pending macro-simulation step.

8. The method according to claim 1, wherein the estimated simulation data Sn is created by the real-time-capable sub-simulation or by the non-real-time-capable sub-simulation or by an error handling system.

9. The method according to claim 1, wherein the creating the estimated simulation data Sn comprises:
- extrapolating the estimated simulation data Sg from earlier calculated simulation data Sn made available by the non-real-time-capable sub-simulation;
- deriving the estimated simulation data Sq from a characteristic curve or a characteristic map;
- creating the estimated simulation data Sg on the basis of earlier simulations;
- limiting the estimated simulation data Sq to predetermined minimum or maximum values;
- aligning the estimated simulation data Sg with a predetermined change dynamic; or
- taking states of the real-time-capable sub-simulation into account.

10. The method according to claim 1, further comprising:
- logging cases in which the non-real-time-capable sub-simulation has not completed any calculated simulation data Sn for the pending macro-simulation step and provided it to the real-time-capable sub-simulation, wherein the logging has a documentation of the points in time or the number of the cases.

11. The method according to claim 1,
- wherein the real-time-capable sub-simulation simulates the environment of the control unit or the technical system to be controlled, and the non-real-time-capable sub-simulation simulates the control unit, or
- wherein the non-real-time-capable sub-simulation simulates the environment of the control unit or the technical system to be controlled, and the real-time-capable sub-simulation simulates the control unit.

12. The method according to claim 1,
- wherein the real-time-capable sub-simulation simulates a first part of the environment of the control unit or a first part of the technical system to be controlled, and
- wherein the non-real-time-capable sub-simulation simulates a second part of the environment of the control unit or a second part of the technical system to be controlled.

13. A simulation device for control unit development, the simulation device being real-time-capable and simulates a control unit or an environment of the control unit or a combination of the control unit and the environment of the control unit, the simulation device comprising:
- a real-time-capable sub-simulation with a first simulation time corresponding to a real time;
- a non-real-time-capable sub-simulation adapted to interact with the real-time-capable sub-simulation, the non-real-time capable sub-simulation having a virtual, second simulation time that is coupled to the first simulation time, the second simulation time adapted to match the first simulation time at a start of the real-time-capable simulation; and
- a communication path (16) adapted to exchange simulation data between the real-time-capable sub-simulation and the non-real-time-capable sub-simulation,
- wherein the non-real-time-capable sub-simulation calculates the calculated simulation data Sn and provides the calculated simulation data Sn to the real-time-capable sub-simulation,
- wherein the real-time-capable sub-simulation checks whether the non-real-time-capable sub-simulation has provided the calculated simulation data Sn for a pending macro-simulation step at a given time and determines a check result of
  - provided when the non-real-time-capable sub-simulation has provided the calculated simulation data Sn for the pending macro-simulation step at the given time and
  - not provided when the non-real-time-capable sub-simulation has not provided the calculated simulation data Sn for the pending macro-simulation step at the given time,
- wherein when the check result is determined to be the provided, the real-time-capable sub-simulation is adapted to use the calculated simulation data Sn for the pending macro-simulation step if the non-real-time-capable sub-simulation has completed calculating the calculated simulation data Sn for the pending macro-simulation step and has provided the calculated simulation data Sn to the real-time-capable sub-simulation,
- wherein when the check result is determined to be the not provided, the real-time-capable sub-simulation is adapted to use estimated simulation data Sg for the pending macro-simulation step if the non-real-time-capable sub-simulation has not completed any calculated simulation data Sn for the pending simulation step and has not provided the calculated simulation data Sn to the real-time-capable sub-simulation,
- wherein the non-real-time-capable sub-simulation is adapted to set the second simulation time to the first simulation time after completing a calculation of the calculated simulation data Sn that was not provided by the given time,
- wherein the non-real-time-capable sub-simulation comprises one or more processors or processor cores, and
- wherein, when the check result is determined to be the provided, after the pending macro-simulation step, the calculated simulation data for the pending macro-simulation step is provided to the real-time-capable sub-simulation and to an error handling system.

14. The simulation device according to claim 13, wherein the one or more processors or processor cores have a computing power that is sufficient to provide the calculated simulation data Sn on time when averaged over an entire course of the simulation.

15. The method according to claim 1, wherein the real-time-capable sub-simulation and the non-real-time-capable sub-simulation interact via the communication path (16) and exchange the simulation data.

16. The method according to claim 1, wherein the real-time-capable simulation includes the error handling system, the error handling system creating the estimated simulation data Sg and transmitting the estimated simulation data Sq to the real-time-capable sub-simulation when the error handling system (Sg) determines that no calculated simulation data Sn has arrived at the error handling system.

17. A simulation device adapted to simulate a control unit or an environment of the control unit or a combination of the control unit and the environment of the control unit over a plurality of macro-simulation steps corresponding to real time, the simulation device comprising:
- a real-time-capable sub-simulation adapted to perform a first calculation of a simulation of the control unit or the environment of the control unit to create a first simulation data Se, the real-time-capable sub-simulation having a first simulation time corresponding to the real time, the real-time-capable sub-simulation being adapted to perform the first calculation based on a second simulation data Sn from a non-real-time-capable sub-simulation or based on an estimated simulation data Sg from an error handling system, the realtime-capable sub-simulation being adapted to complete the first calculation and create the first simulation data Se within each macro-simulation step;

the non-real-time-capable sub-simulation adapted to perform a second calculation of the simulation of the control unit or the environment of the control unit to create the second simulation data Sn, the non-real-time-capable sub-simulation having a second simulation time, the second simulation time being virtual and matching the first simulation time at a start of a real-time simulation of the control unit or the environment of the control unit or the combination of the control unit and the environment of the control unit; and the error handling system adapted to create the estimated simulation data Sg based on the second simulation data Sn from the non-real-time-capable sub-simulation, wherein the real-time-capable sub-simulation is adapted to:
  determine whether a previous second simulation data Sn corresponding to a previous macro-simulation step has been provided by the non-real-time-capable sub-simulation, the previous macro-simulation step being a macro-simulation step previous to a current macro-simulation step;
  create a current first simulation data Se based on the previous second simulation data Sn when it is determined that the previous second simulation data Sn has been provided, the current first simulation data Se corresponding to the current macro-simulation step; and
  create the current first simulation data Se based on a previous estimated simulation data Sg corresponding to the previous macro-simulation step when it is determined that the previous second simulation data Sn has not been provided, wherein the non-real-time-capable sub-simulation is adapted to:
  create a current second simulation data Sn corresponding to the current macro-simulation step based on a previous first simulation data Se corresponding to the previous macro-simulation step;
  determine whether the current macro-simulation step has passed; and
  provide the current second simulation data Sn to the real-time-capable sub-simulation and to the error handling system when it is determined that the current macro-simulation step has not passed, and wherein the error handling system is adapted to:
  determine whether the previous second simulation data Sn has been provided by the non-real-time-capable sub-simulation to the real-time-capable sub-simulation; and
  provide the previous estimated simulation data Sg to the real-time-capable sub-simulation when it is determined that the previous second simulation data Sn has not been provided.

18. The simulation device of claim 17, wherein the non-real-time-capable sub-simulation is further adapted to:
  provide the current second simulation data Sn to the error handling system, but not to the real-time-capable sub-simulation when it is determined that the current macro-simulation step has passed.

19. The simulation device of claim 17, further comprising:
  an input data buffer,
  wherein the real-time-capable sub-simulation is adapted to write the first simulation data Se to the input data buffer, and
  wherein the non-real-time-capable sub-simulation is adapted to remove the first simulation data Se from the input data buffer.

* * * * *